(12) United States Patent
Gorgenyi et al.

(10) Patent No.: US 11,716,329 B2
(45) Date of Patent: *Aug. 1, 2023

(54) SECURE VERIFICATION OF AN INDIVIDUAL USING WIRELESS BROADCASTS

(71) Applicant: Microsoft Technology Licensing, LLC, Redmond, WA (US)

(72) Inventors: Frank Gorgenyi, Bremerton, WA (US); Matthew Thomas Beaver, Seattle, WA (US); Aidan George Purdy-Say, Seattle, WA (US); Bartosz Henryk Paliswiat, Kirkland, WA (US); Jared Enoch Henderson, Maple Valley, WA (US); Brian Andrew Bowman, Seattle, WA (US); Peter Dawoud Shenouda Dawoud, Bothell, WA (US); Arvind Muthukrishnan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,273

(22) Filed: Aug. 3, 2021

(65) Prior Publication Data

US 2021/0367939 A1 Nov. 25, 2021

Related U.S. Application Data

(63) Continuation of application No. 16/384,799, filed on Apr. 15, 2019, now Pat. No. 11,089,015.

(51) Int. Cl.
*H04L 9/40* (2022.01)
*G07C 9/25* (2020.01)
(Continued)

(52) U.S. Cl.
CPC .......... *H04L 63/0861* (2013.01); *G07C 9/257* (2020.01); *H04L 63/0428* (2013.01);
(Continued)

(58) Field of Classification Search
CPC ............ H04L 63/0861; H04L 63/0853; H04L 67/306; H04W 12/00503; H04W 12/00512
(Continued)

(56) References Cited

U.S. PATENT DOCUMENTS 10,951,616 B2 * 3/2021 Romero .............. H04L 63/0876
11,228,913 B2 * 1/2022 Jimenez .............. H04L 63/0876
(Continued)

OTHER PUBLICATIONS

Stefan Saroiu; Enabling New Mobile Applications with Location Proofs; ACM: 2009; p. 1-6.*

*Primary Examiner* — Monjur Rahim
(74) *Attorney, Agent, or Firm* — Ray Quinney & Nebeker P.C; James Bullough

(57) ABSTRACT

The present disclosure relates to systems, methods, and computer-readable media for securely verifying an identity of a user of a client device based on a signal transmitted by the client device. For example, systems disclosed herein include registering a client device and facility device via a cloud computing system to enable the client device and facility device to securely communicate a signal via a wireless connection. The systems disclosed herein additionally include determining whether a trigger condition applies based on a position of the client device relative to the facility device. The systems disclosed herein further include maintaining and updating a subset of user verification information to include personal verification of a registered user of the client device. Using the subset of user verification information, a biometric scanning device may efficiently and (Continued)

accurately verify an identity of an individual associated with the client device.

20 Claims, 8 Drawing Sheets

(51) Int. Cl.
*H04L 67/306* (2022.01)
*H04W 60/00* (2009.01)
*H04W 12/63* (2021.01)
*H04W 12/71* (2021.01)
*H04W 12/64* (2021.01)

(52) U.S. Cl.
CPC ........ *H04L 63/0853* (2013.01); *H04L 67/306* (2013.01); *H04W 12/63* (2021.01); *H04W 12/71* (2021.01); *H04W 60/00* (2013.01); *H04W 12/64* (2021.01)

(58) Field of Classification Search
USPC .......................................................... 713/186
See application file for complete search history.

(56) References Cited

U.S. PATENT DOCUMENTS

| | | | |
|---|---|---|---|
| 11,304,123 B1* | 4/2022 | Noonan | H04W 48/16 |
| 2004/0036574 A1* | 2/2004 | Bostrom | G07C 9/37 |
| | | | 340/5.82 |
| 2015/0079933 A1* | 3/2015 | Smith | H04W 4/02 |
| | | | 455/411 |
| 2016/0094947 A1* | 3/2016 | Shen | G01S 1/68 |
| | | | 455/456.1 |
| 2018/0192238 A1* | 7/2018 | Low | H04L 67/306 |
| 2020/0128395 A1* | 4/2020 | Mars | H04L 63/0861 |
| 2020/0145414 A1* | 5/2020 | Romero | G06F 21/35 |
| 2022/0150702 A1* | 5/2022 | Klinkner | H04W 12/104 |

* cited by examiner

SECURE VERIFICATION OF AN INDIVIDUAL USING WIRELESS BROADCASTS

CROSS-REFERENCE TO RELATED APPLICATIONS

This application is a continuation of U.S. patent application Ser. No. 16/384,799, filed on Apr. 15, 2019, the entirety of which is incorporated herein by reference.

BACKGROUND

Recent years have seen rapid development in communication technology, particularly in the capabilities of electronic devices to communicate with one another over wireless networks. For example, electronic devices often include short-range wireless communication capabilities that enable a variety of devices to communicate with one another over short-range wireless connections. Indeed, many computing devices can transmit personal information for use in a variety of applications including identification or verification of a client device and/or an individual corresponding to the client device.

Communicating information between devices, however, has a number of problems and drawbacks. For example, wirelessly announcing or broadcasting a signal that includes information about an individual or device is often insecure and enables non-intended audiences to hijack or receive the personal information. In addition, conventional methods for establishing secure communications between devices often involve authentication procedures that take time and consume significant battery power and processing resources. Moreover, as digital security becomes more common and complex, conventional processes for comparing massive quantities of personal records often become computationally prohibitive.

DETAILED DESCRIPTION

Figure 1:
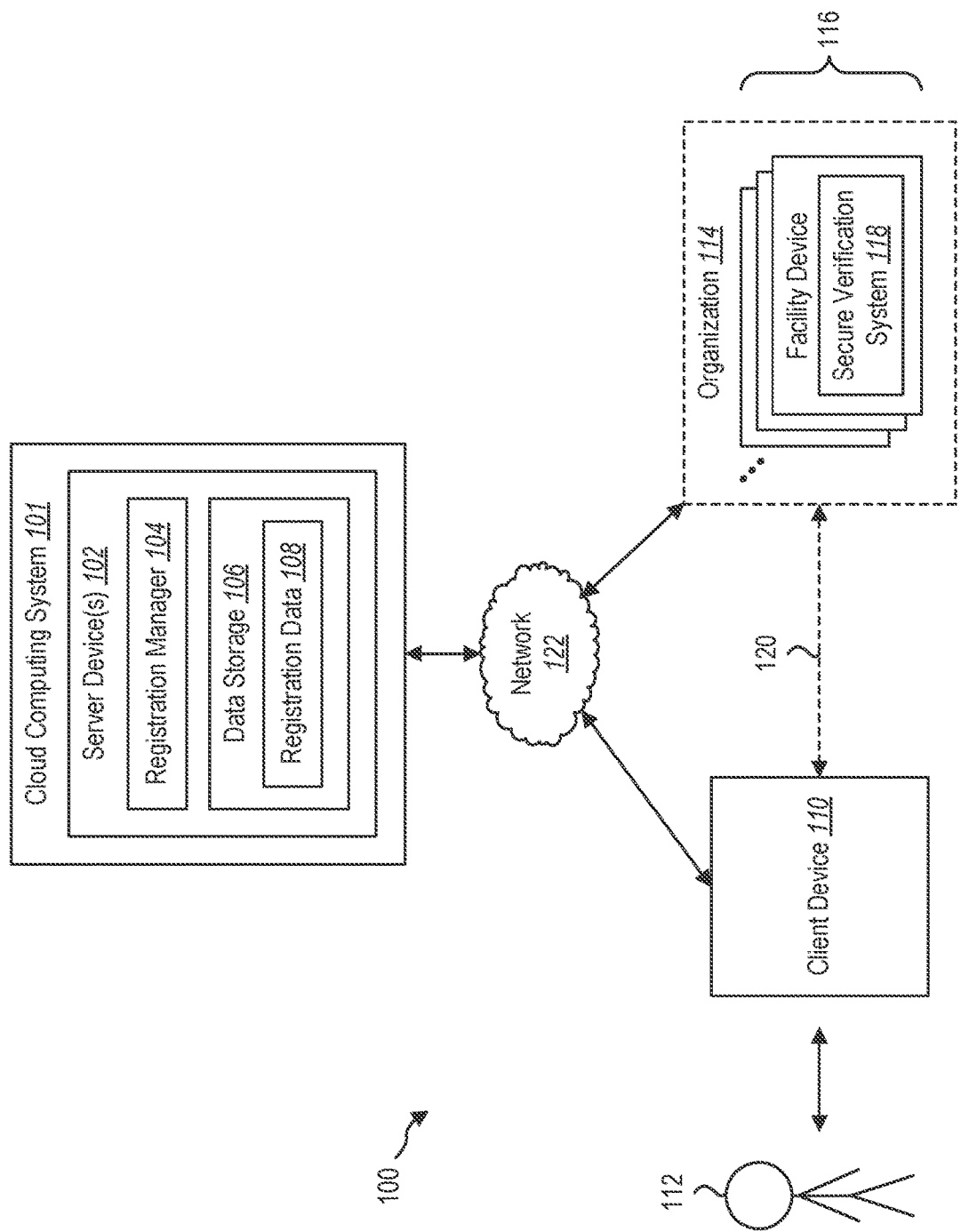
FIG. 1 illustrates an example environment including a secure verification system in accordance with one or more implementations.

The present disclosure relates to a secure verification system implemented in connection with a facility device and client device to facilitate a secure and offline verification of an individual based on a wirelessly transmitted signal emitted from a client device. In particular, as will be discussed in further detail below, a cloud computing system may facilitate registration of a client device with a facility device having access to a collection of entries including information (e.g., user verification information) associated with corresponding individuals of an organization. As will be discussed in further detail below, registering the client device may involve distributing encryption and decryption data to a client device and a facility device (or multiple facility devices) to enable the client device to transmit a wireless communication including a secure value (e.g., a random value, an encrypted value) that the facility device is capable of receiving and deciphering.

In addition to enabling a client device and facility device to securely communicate a value via a wireless transmission, the facility device may effectively predict whether the user of the client device will present biometric information for verification of the identity of the user. For example, the facility device may consider characteristics of the received signal from the client device to detect or otherwise identify a trigger condition indicative of an individual approaching a biometric scanner associated with the facility or organization. For instance, the facility device may determine that a trigger condition applies based on a proximity of the client device to the facility device, a direction or orientation of the client device relative to the facility device, and/or movement of the client device relative to a geographic location of the facility device.

Upon detecting or otherwise identifying a trigger condition associated with a client device, the secure verification system can perform one or more actions in preparation of verifying an individual against a collection of entries including personal information mapped to the client device. In particular, the secure verification system can compare information obtained from the signal received from the client device against a collection of entries to identify information about a corresponding individual. The secure verification system can additionally generate or maintain a subset of entries including selective information from a larger collection of information about those individuals associated with the detected trigger conditions. For example, the secure verification system can maintain a local cache (e.g., a locally accessible storage space) including a subset of personal information from a larger collection of personal information associated with any number of individuals of an organization. In one or more embodiments, the subset of personal information is used for verifying the identity of an individual within a vicinity of the facility device (e.g., a user carrying a client device in a pocket or bag).

The present disclosure includes a number of practical applications that provide benefits and/or solve one or more problems associated with securely verifying the identity of an individual based at least in part on a signal transmitted from a client device and while maintaining privacy of the individual. For example, by registering a client device and facility device using a cloud computing system, the cloud computing system may act as a trusted broker of encryption and decryption information to enable the client device and facility device to communicate in a secure way that maintains privacy of the individual. Indeed, by providing decryption information to a facility device, a secure verification system on the facility device may decipher a value (e.g., a random or encrypted value) received from the client device to identify personal information corresponding to the client device. The personal information may then be used as a source of information to accurately verify the identity of an individual carrying the client device. In one or more implementations, the information exchanged between devices may be used to challenge an identification of the device itself using existing mechanisms or protocols.

As will be discussed in further detail below, this information may be used in accordance with specific examples described herein to grant access to a device, network of devices, a building, or other physical facility. Nevertheless, it will be understood that this information may be used in any application that involves verifying the identity of an individual based on a face scan, fingerprint scan, or any biometric scan of the individual associated with the client device.

Moreover, while one or more embodiments described herein relate specifically to verifying an individual (or device) based on a comparison between personal verification information from a stored entry and data obtained via a biometric scan, one or more examples described herein may involve other forms of verification. For instance, rather than comparing a biometric scan to stored biometric data, the secure verification system may utilize other verification mechanisms (e.g., a pin value, a voice identification). Indeed, verifying an individual or device against verification information may include a number of different challenge mechanisms.

In addition to enabling a client device to securely communicate a decipherable value to a facility device, the secure verification system can utilize the information received from the client device to enhance the accuracy and speed associated with verifying the identity of an individual. For example, the secure verification system can use the information obtained from the signal to identify an entry including personal information mapped to the client device of an individual. The secure information system can identify the entry as a possible entry to compare against in verifying whether a user of the client device is the same individual as the individual from the entry. In this way, when the user of the client device interacts with a biometric verification system or device (e.g., a face scanner, fingerprint scanner), the scanned biometric information may be compared to a select number of entries representative of a few individuals rather than a larger collection of entries representative of an entire organization. By comparing the scanned biometric information to a limited subset of user verification information, the secure verification system can quickly verify an identity of the individual in a frictionless manner without significant delay and using fewer processing resources than conventional security systems.

As illustrated in the foregoing discussion, the present disclosure utilizes a variety of terms to describe features and advantages of a secure verification system. Additional detail will now be provided regarding the meaning of such terms. For instance, as used herein, a "facility device" refers to any computing device associated with an organization and which includes the capability to decrypt, decode, or otherwise decipher information from a signal received from a client device. In particular, a facility device may refer to a computing device associated with an organization that is registered with a cloud computing system (or other computing system) to receive decryption information (e.g., one or more decryption keys) that enables the facility device to decrypt an encrypted signal broadcast or otherwise transmitted by a client device.

As used herein, a "client device" may refer to any portable computing device such as a mobile device (e.g., a smartphone, a tablet), a laptop, or other computing device capable of being carried or transported by a user. Similar to the facility device, the client device may refer to a computing device that has been registered with a cloud computing system. In particular, the client device may receive information (e.g., an encryption key, an encryption schedule) from the cloud computing system that enables the client device to transmit (e.g., broadcast, advertise) a signal including an encrypted value that the facility device is capable of decrypting or otherwise deciphering based on decryption information also received from the cloud computing system. Additional information in connection with the client device and registering the client device is described below in connection with one or more embodiments of the secure verification system.

As used herein, an "entry," "user entry," or "individual entry" refers interchangeably to any information associated with an individual and a corresponding client device. For example, an entry may refer to a file or discrete portion of data including a client device identifier and corresponding personal information associated with a user (e.g., an owner) of the client device. In one or more embodiments, an entry includes an index or mapping data that maps a client device identifier to corresponding user verification information or other personal information. While one or more embodiments described herein refer specifically to an entry including information for a single client device identifier and a corresponding individual, it will be understood that an entry may include multiple device identifiers that correspond to a single individual. Accordingly, the secure verification system may facilitate accurate and secure verification of an individual based on a signal transmitted by one of a number of client devices (e.g., a mobile device and a laptop).

As used herein, "user verification information" may refer to any information about an individual that may be used to verify an identity of the individual. As an example, user verification information may include biometric data, profile data, usernames, passwords, or other information that may be used in connection or in combination with a biometric scan to verify the identity of an individual. In one or more embodiments, user verification information refers specifically to facial data or fingerprint data that may be compared to biometric data captured using a face scanning device or fingerprint scanning device. Nevertheless, user verification information may refer to other types of biometric data that may be used to verify an identity of an individual using any type of biometric scanning system.

An entry may refer to a single entry corresponding to an individual and client device(s) from a collection of multiple entries. As used herein, a "collection of entries" refers to a collection of user verification information, which may include any number of entries representative of multiple users and associated client devices that have been registered with a corresponding set of one or more facility devices. For example, a collection of entries may include a collection of files including identifiers of client devices mapped to corresponding user verification information associated with some or all users of a respective organization. As will be discussed in further detail below, an organization may include a company, business, school, or any other entity that implements and manages a set of one or more facility devices.

Additional detail will now be provided regarding a secure verification system in relation to illustrative figures portraying example implementations. For example, FIG. 1 illustrates an example environment 100 for identifying personal information likely to correspond to an individual associated with a client device based on a signal transmitted from the client device and received by a facility device. As shown in FIG. 1, the environment 100 includes one or more server device(s) 102 implemented within a cloud computing system 101. As shown in FIG. 1, the server device(s) 102 includes a registration manager 104 and a data storage 106. The data storage 106 may be used to store and provide access to registration data 108 (e.g., user registration data, facility registration data). While one or more embodiments described herein relate to a cloud computing system 101 including server device(s) 102, it will be understood that any network (e.g., a local or distributed network) of one or more computing devices capable of generating and/or providing registration information to one or more devices of the environment 100 may similarly be used to facilitate features and functionalities described herein.

As further shown in FIG. 1, the environment 100 includes a client device 110 and associated user 112 in communication with an organization 114 having a plurality of facility devices 116. The facility devices 116 may include a secure verification system 118 implemented thereon. In addition, the client device 110 may communicate with the organization 114 of facility devices 116 via a wireless connection 120. The wireless connection 120 may refer to any short-range wireless network or communication medium over which a signal may be broadcast, advertised (e.g., a Bluetooth advertisement), transmitted, or otherwise communicated between the client device 110 and facility devices 116.

In addition, while FIG. 1 illustrates an example environment 100 including a plurality of facility devices 116 within a single organization 114, one or more embodiments described herein may refer to any number of facility devices implemented across multiple organizations. For example, a first organization associated with a school or university may include a first plurality of facility devices while a second organization associated with a business or other entity may include a second plurality of facility devices. In addition, a third organization may refer to a private organization or household including a single or small number of facility devices. Each of the facility devices of the respective organizations may receive unique registration information to enable the facility devices to receive and decipher communications received from only those client devices that have been registered with the associated organizations.

The server device(s) 102 of the cloud computing system 101, the client device 110, and the facility devices 116 may additionally communicate over a network 122. The network 122 may include one or multiple networks that use one or more communication protocols or technologies for transmitting data. For example, the network 122 may include the internet or another data link that enables transport of electronic data between the server device(s) 102, client device 110, and organization 114 of facility devices 116.

As previously mentioned, the server device(s) 102 includes a registration manager 104. The registration manager 104 can register any number of entries for client devices and corresponding users. The registration manager 104 can additionally register any number of facility devices for any number of corresponding organizations. In particular, the registration manager 104 may register a client device 110 with a corresponding organization 114 of facility devices 116 by collecting data about the client device 110 and facility devices 116 and creating entries including registration information for the respective devices.

As shown in FIG. 1, the registration manager 104 manages registration data 108. In one or more implementations, the registration data 108 includes information that enables a client device 110 and facility devices 116 to securely communicate and decipher one or more values (e.g., device identifiers) without compromising privacy of the client device 110 or the organization 114. For instance, the registration data 108 may include encryption and decryption data to enable the client device 110 and facility devices 116 to communicate securely over the wireless network 122. The registration data 108 may include one or more encryption and decryption keys. The registration data 108 may additionally include an encryption schedule (e.g., an encryption key schedule) that determines what encryption value and/or decryption method can be used to decipher an encrypted value. Indeed, the registration data 108 may include any instructions or data that the client device 110 and facility devices 116 use in generating an encrypted communication as well as deciphering one or more values from the encrypted communication.

In addition to information that enables the client device 110 and facility devices 116 to securely communicate, the registration data 108 may include a collection of entries representative of any number of devices and associated users that belong to an organization 106. For example, the registration data 108 may include an entry for the client device 110 and associated user 112. The entry may include a device identifier and biometric information, such as information about a face, fingerprint, or profile of the user 112. The entry may additionally (or alternatively) include mapping information that relates device information (e.g., a device identifier) or other values with corresponding user information (e.g., biometric data) to enable a facility device to identify corresponding user information based on a device identifier (or visa versa).

In addition to information about the user 112 and associated client device 110, the registration data 108 may include information about one or more facility devices 116 and the organization 114. For example, the registration data 108 may include an identification of the facility devices 116 that make up an organization 114. In addition, the registration data 108 may include an identification or entry for each individual that belongs to or is otherwise registered with the organization 114. For instance, where the registration data 108 includes entries corresponding to individuals and devices across multiple organizations, the registration data 108 may organize the registration data by organization to include discrete collections of entries for respective organizations 114.

As mentioned above, the registration manager 104 may register a client device 110 and associated user 112 with an organization 114 of facility devices 116. Registering the client device 110 and associated user 112 with the organization 114 may include providing registration information to one or both of the client device 110 and facility devices 116. For example, the registration manager 104 may provide encryption keys and an encryption schedule to the client device 110 to enable the client device 110 to generate and transmit a signal including an encrypted value to be decrypted using corresponding decryption information (e.g., a decryption key) provided to the facility devices 116. In addition, the registration manager 104 may provide decryption keys and the encryption schedule to the facility devices 116 to enable a secure verification system 118 on each of the facility devices 116 to decrypt or otherwise decipher communications received from the client devices 106.

Where the facility devices 116 do not already include mapping information that enables the facility devices 116 to identify personal information (e.g., user verification information) corresponding to respective client devices, the registration manager 104 can additionally provide the mapping information to the facility devices 116. As additional client devices 106 are registered by the registration manager 104, the registration manager 104 can update registration information and provide any updates to the facility devices 116.

While FIG. 1 illustrates an example environment 100 including a particular number and arrangement of server device(s) 102, a client device 110, and a single organization 114 of facility devices 116, it will be understood that the environment 100 may include any number of devices, including one or more server devices on the same or different cloud computing systems, one or multiple client devices associated with a particular user, and multiple organizations including different numbers of facility devices. Accordingly, the registration data 108 can include multiple entries for an individual user associated with multiple client devices and/or associated with different organizations or groupings of facility devices.

Figure 2:
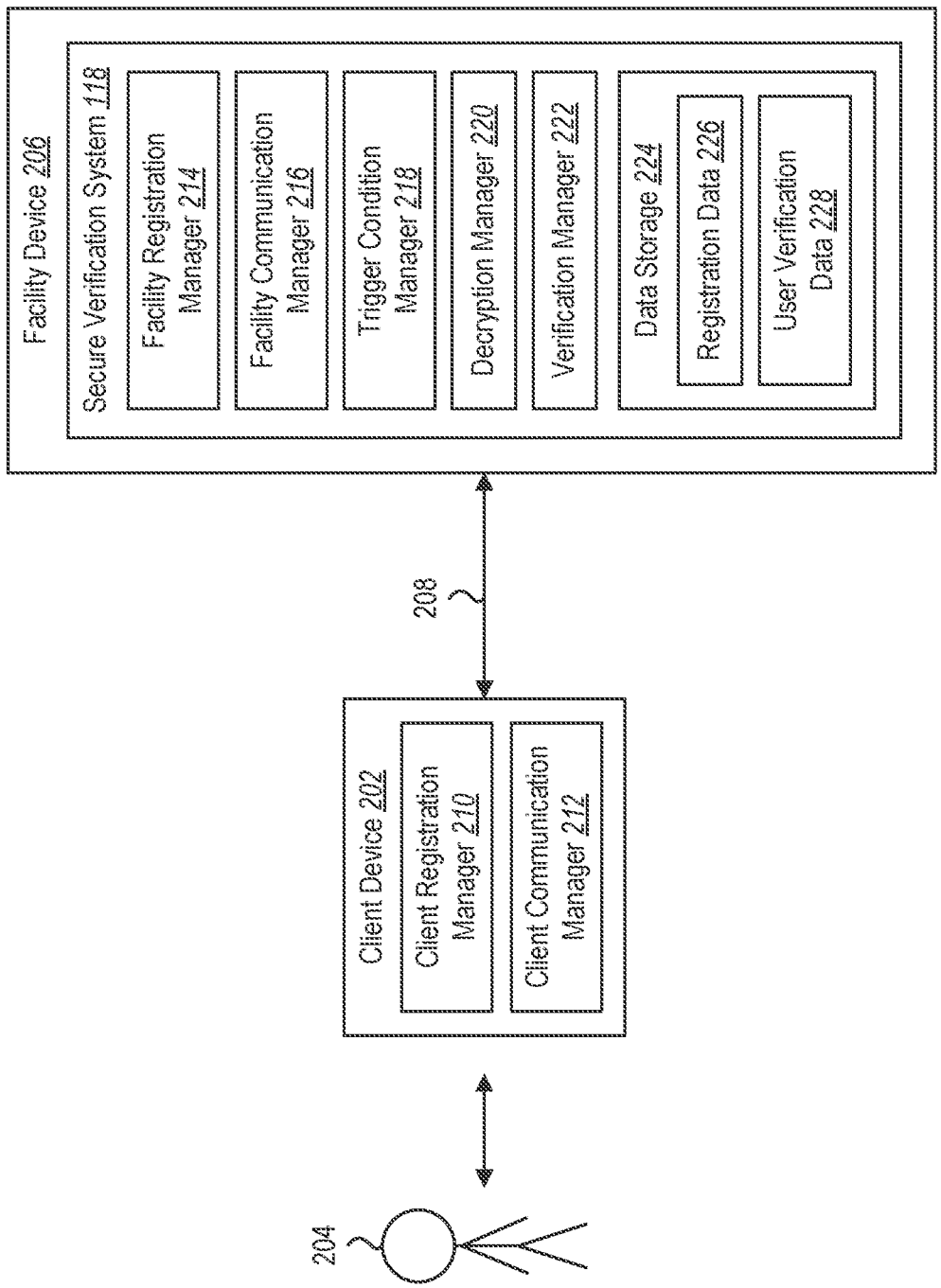
FIG. 2 illustrates an example framework for performing an offline verification of an individual associated with a client device in accordance with one or more implementations.

Proceeding to FIG. 2, additional detail will now be given with regard to receiving a signal from a client device and identifying a corresponding entry to use in verifying an identity of a user associated with the client device. In particular, FIG. 2 illustrates an example exchange of information between a client device 202 associated with a user 204 and a facility device 206 over a wireless connection 208 between the client device 202 and the facility device 206. The client device 202 may include similar features and functionality of the client device 110 described in FIG. 1. In addition, the facility device 206 may refer to an individual facility device from the organization 114 of facility devices 116 described above in connection with FIG. 1.

As shown in FIG. 2, the client device 202 includes a client registration manager 210 and a client communication manager 212. The client registration manager 210 may facilitate registering the client device 202 with the cloud computing system 101 as discussed above in connection with FIG. 1. For example, the client registration manager 210 may provide select information about the client device 202 and associated user 204 to a cloud computing system 101 and receive registration data including facility information, encryption information, and any other information to enable the client device 202 to generate and transmit a communication signal to the facility device 206.

The client communication manager 212 can facilitate communication of encrypted information via the wireless connection 208. For example, the client communication manager 212 can cause the client device 202 to broadcast an advertisement including an encrypted value. The client communication manager 212 may advertise the signal at regular intervals based on instructions received with the registration information. In addition, or as an alternative, the client communication manager 212 can advertise the signal in response to receiving a signal (e.g., a beacon signal) or other trigger from the facility device 206. Additional detail with regard to generating and transmitting a signal under various circumstances is discussed by way of example in further detail below in connection with FIGS. 5 and 6.

The facility device 206 may include a secure verification system 118. As shown in FIG. 2, the secure verification system 118 may include a facility registration manager 214, a facility communication manger 216, a trigger condition manager 218, a decryption manager 220, a verification manager 222, and a data storage 224. The data storage 224 may include registration data 226 and user verification data 228.

Similar to the client registration manager 210, the facility registration manager 214 may facilitate registering the facility device 206 with the cloud computing system 101 as discussed above in connection with FIG. 1. For example, the facility registration manager 214 can receive registration data 226 that includes about how to decipher a signal received from the client device 202. This information may enable the secure verification system 118 to decipher an encrypted signal received via a broadcast or announcement transmitted by the client device 202.

The secure verification system 118 may additionally include a facility communication manager 216. Similar to the client communication manager 212, the facility communication manager 216 can facilitate receiving and transmitting communications from the facility device 206. For example, the facility communication manager 216 can receive an encrypted signal broadcast from the client device 202 via the wireless connection 208. In one or more embodiments, the facility communication manager 216 can broadcast a beacon signal or other communication that causes the client communication manager 212 to generate and broadcast the encrypted signal.

As further shown in FIG. 2, the secure verification system 118 includes a trigger condition manager 218. The trigger condition manager 218 may identify or otherwise detect a trigger condition associated with whether an individual will attempt to gain access to a computing system and/or physical facility. In particular, the trigger condition manager 218 may analyze a signal announced by the client device 202 to determine physical and movement characteristics of the client device 202 that may be used to accurately determine or predict that the user 204 of the client device 202 will perform a face scan, fingerprint scan, or other procedure to verify that an identity of the user corresponds to an identity of an individual that has permission to access the facility.

The trigger condition manager 218 can identity a trigger condition in a number of ways. For example, the trigger condition manager 218 can determine that the client device 202 is within a predetermined proximity of the facility device 206. In addition, the trigger condition manager 218 can determine that the client device 202 is both within a proximity and in a predetermined direction or orientation relative to the facility device 206. As another example, the trigger condition manager 218 can determine that the client device 202 is moving in a predetermined direction relative to the facility device 206 (e.g., that the client device 202 is moving toward the facility device 206).

The trigger condition manager 218 can additionally consider a combination of position and movement to determine or predict that the user 204 will perform a biometric scan to gain access to a facility. For example, the trigger condition manager 218 can apply a positioning algorithm that considers a combination of position, direction, and movement to determine whether a trigger condition applies. To illustrate, where a client device is both within a proximity of the facility device 206 and moving towards the facility device 206, the trigger condition manager 218 may determine that a trigger condition applies for the client device 202. Alternatively, where the client device is within a proximity of the facility device 206, but not moving toward the facility device 206, the trigger condition manager 218 can determine that a trigger condition does not apply. Additional examples of affirmatively or negatively identifying trigger conditions associated with proximity of the client device 202 relative to the facility device 206 is discussed in further detail below in connection with FIGS. 3-4.

The secure verification system 118 may additionally include a decryption manager 220. Upon receiving a signal from the client device 202, the decryption manager 220 can use registration information received from the cloud computing system 101 to decrypt, decode, or otherwise decipher one or more values included within the signal. In one or more embodiments, the decryption manager 220 decrypts the signal by applying an algorithm received from the cloud computing system 101 to an encrypted value to generate a decrypted value that may be used to identity an entry from a collection of entries corresponding to the client device 202.

The secure verification system 118 may additionally include a verification manager 222. Upon decrypting any signal(s) received from the client device 202, the verification manager 222 may identify a corresponding entry from a collection of entries to determine an identifier of the client device 202 and/or user 204 of the client device 202. For example, based on the decrypted value determined by the decryption manger 220, the secure verification system 118 may identify an entry that includes personal information (e.g., user verification information) associated with the client device 202 and which is accessible to the facility device 206. The personal information may include user verification information (e.g., biometric data) that may be used to verify the identity of an individual.

In addition to identifying user verification information corresponding to the decrypted value from the signal, the verification manager 222 may additionally manage a subset of entries corresponding to one or more client devices that have been registered with an organization and for which a triggering condition has been detected. For example, in response to detecting a trigger condition, the verification manager 222 can both identify an entry from the collection of entries corresponding to the client device 202 and update a subset of entries to include the identified entry based on the deciphered or decrypted value determined from the signal received from the client device 202.

As shown in FIG. 2, the facility device 206 can include a data storage 224 having registration data 226 and user verification data 228. The registration data 226 may refer to any information received from the cloud computing system 101 as part of the process of registering the facility device 206 and client device 202 with the cloud computing system 101. For example, the registration data 226 may include encryption and/or decryption data that enables the facility device 206 to decipher an encrypted signal received from the client device 202. This may include security keys, encryption schedules, or other data that facilitates secure communication over the wireless connection 208 between the client device 202 and facility device 206.

In addition to the registration data 226, the data storage 224 may include user verification data 228 including any biometric information or other personal information that may be used to verify an identity of the user 204 of the client device 202. For example, the user verification data 228 may include face data, fingerprint data, or any biometric data. The user verification data 228 may be compared to data captured by a biometric scanning device to accurately determine that the user 204 is the registered individual associated with the client device 202.

As mentioned above, and as will be discussed in further detail below in connection with FIG. 4, the secure verification system 118 can manage a subset of entries including a subset of the user verification information from the user verification data 228. In one or more embodiments, the secure verification system 118 updates a subset of entries including a local cache accessible to the facility device 206. In one or more implementations, the local cache is accessible by any facility device of an organization and includes a current subset representative of any number of client devices that have been identified and for which a trigger condition applies. As an alternative to a local cache, the secure verification system 118 may maintain a subset of entries including an index or mapping data that indicates a location of user verification information associated with one or more client devices for which a triggering condition has been recently detected.

Features and functionalities of the secure verification system 118 described in connection with FIGS. 1 and 2 provide a number of practical applications that yield a number of technical benefits. As an example, by generating and managing a subset of user verification information from a larger collection of user verification information, the secure verification system 118 can significantly reduce the quantity of biometric information used in verifying the identity of an individual attempting to gain access to a facility. For instance, upon scanning a face, rather than comparing the scan to a collection of all faces for an organization, the scan may instead be compared to the subset of user verification information corresponding to any client devices for which the secure verification system 118 has determined that a trigger condition applies. Accordingly, the secure verification system 118 may enable a face detection system to accurately verify an identity of an individual by comparing a face scan to a fraction of faces for individuals that have registered with a large organization.

In addition, by utilizing a cloud computing system 101 as a trusted entity for registering the client device 202 and facility device 206, the secure verification system can perform offline verification of the user 204 of the client device 202. In particular, rather than querying the cloud computing system 101 to access encryption or decryption information, the secure verification system 118 can identify user verification data corresponding to an identifier of the client device 202 without querying the cloud computing system 101 at every instance of receiving a wireless signal from the client device 202. Performing offline verification in this way can significantly reduce consumption of battery power of the client device 202 as well as reduce utilization of bandwidth by the facility device 206.

As shown in FIG. 2, components 214-224 of the secure verification system 118 are implemented on a facility device 206. Alternatively, one or more components 214-224 may be implemented wholly or partially on one or more additional devices (e.g., a geometric scanning device or between multiple facility devices). In addition, the components 214-224 can include software, hardware, or a combination of both. The components 214-224 can include one or more instructions stored on a computer-readable storage medium and executable by processors of one or more computing devices. When executed by the one or more processors, the computer-executable instructions of the secure verification system 118 can cause the facility device 206 to perform one or more methods or series of acts described herein (e.g., in connection with FIG. 7 described below). Alternatively, the components 214-224 of the secure verification system 118 can comprise hardware, such as a special-purpose processing device, to perform a certain function or group of functions. The components 214-224 of the secure verification system 118 can also include a combination of computer-executable instructions and hardware.

Figure 3:
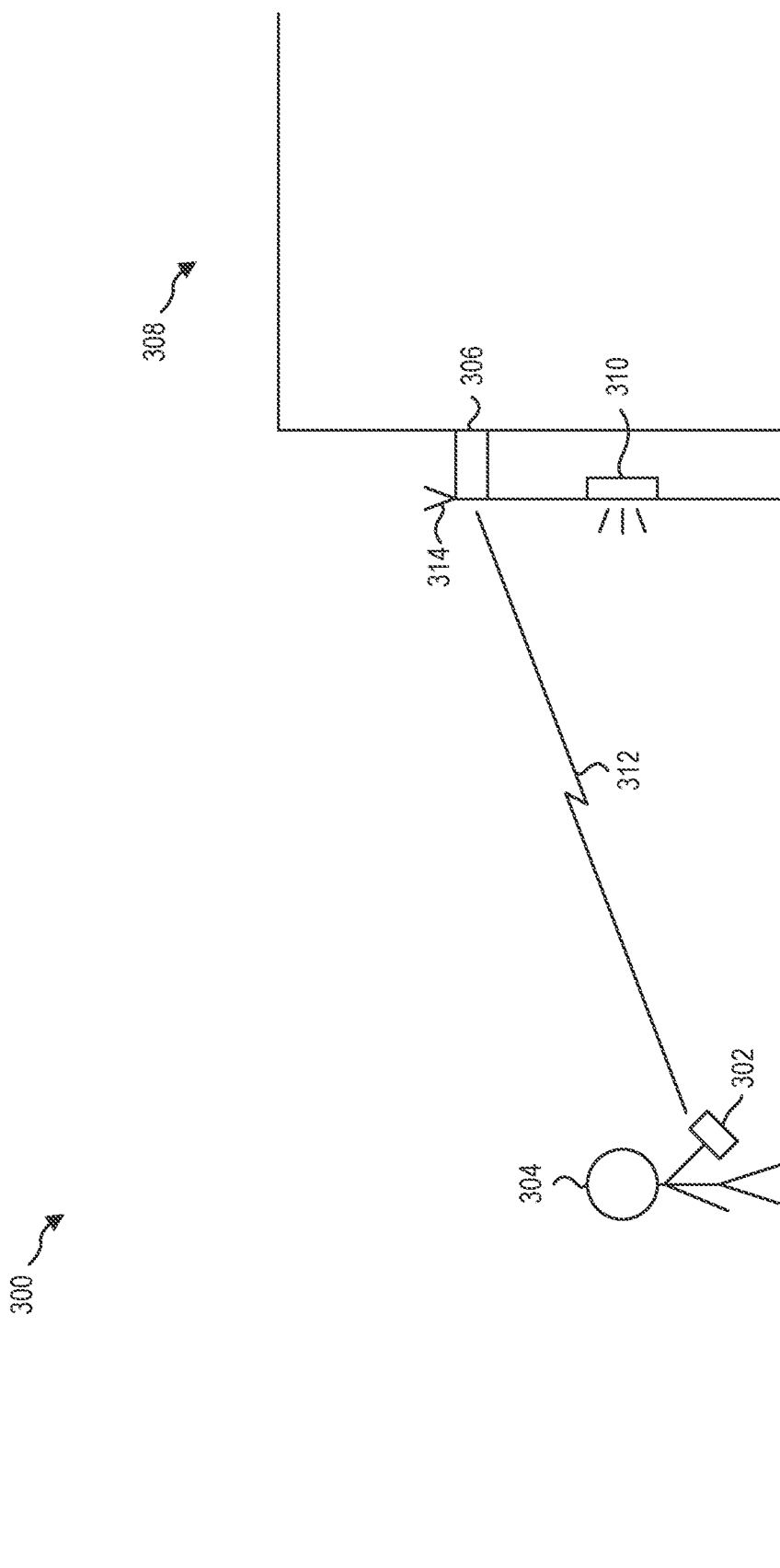
FIG. 3 illustrates an example implementation of a secure verification system for verifying an individual based on a signal transmitted by a client device in accordance with one or more implementations.

FIG. 3 illustrates an example implementation of a secure verification system 118 in accordance with one or more embodiments described above. For example, FIG. 3 illustrates an environment 300 including a client device 302 being held by a user 304 that approaches a facility device 306 positioned over a door of a facility 308. As shown in FIG. 3, the door of the facility 308 includes a biometric face scanner 310 through which the user 304 may receive permission to enter by way of a biometric face scanner 310 that scans individuals as they approach the door of the facility 308 and verifies the user 304 by comparing the scanned face with user verification information maintained by or otherwise accessible to the facility device 306.

As shown in FIG. 3, the client device 302 may generate and broadcast a signal to be received by the facility device 306 via a wireless connection 312 between the client device 302 and the facility device 306. As further shown, the facility device 306 may include an antenna device 314 having one or more antennas for receiving incoming signals as well as transmitting outgoing signals.

In accordance with one or more embodiments described above, the client device 302 may generate and transmit (e.g., announce, broadcast) a signal to be received by the facility device 306 via the wireless connection 312. The client device 302 may transmit the signal in a variety of ways and based on a number of factors. For example, in one or more embodiments, the client device 302 broadcasts a signal at scheduled or fixed intervals based on instructions from distributed registration information, based on operating system parameters, and/or based on hardware specifications of the client device 302.

As a further example, the client device 302 may broadcast a signal based on an active or passive status of the client device 302. For instance, where the client device 302 is in a passive state, the client device 302 may broadcast a periodic announcement every few minutes or at longer intervals than when the client device 302 is in an active state. In one or more embodiments, the client device 302 toggles between a passive state and an active state based on whether the client device 302 is within a geographic proximity of the facility 308 (or facility device 306). Alternatively, the client device 302 may toggle between a passive and active state based on a received signal transmitted by the facility device 306.

In one or more embodiments, the client device 302 transmits the signal in response to receiving a beacon signal from the facility device 306. For example, in one or more embodiments, the facility device 306 includes or makes use of a beacon generating device that generates and broadcasts a beacon signal to instruct any registered client device within a proximity of the facility device to activate or open an application for generating and providing a signal including a value (e.g., an encrypted value) that the facility device 306 may decipher and use to identify user verification data associated with the user 304 of the client device 302. For example, where the hardware or operating system of the client device 302 does not permit an application to passively advertise a signal, or where the operating system prevents an application running in the background (or which is turned off) from periodically broadcasting a signal, the beacon signal may act as a trigger for opening an application and enabling the client device 302 to broadcast a signal including a value in accordance with one or more embodiments described herein.

In addition to transmitting the signal in response to receiving the beacon signal, in one or more implementations, the client device 302 advertises or otherwise generates and transmits a signal based on any number of client-detected triggers. For instance, the client device 302 may detect a presence of a geofence (e.g., using global position system (GPS) capabilities of the client device 202) relative to a position of the facility device 306. Upon entering the geofence, the client device 302 may toggle or activate an active status of the client device 302 (e.g., open an application for transmitting the signal including the encrypted value) or simply advertise the signal in response entering a region or boundary defined by the geofence.

As another example, the client device 302 may include a calendar item or scheduled appointment based on a time period when the user 304 is expected to approach the facility 306. For instance, where a user 304 has permission to enter a facility 308 during limited hours or where a calendar or other scheduling application on the client device 302 includes an appointment that indicates the user 304 will be attempting to enter or access a facility 308, an appointment or other scheduling information stored on the client device 302 may act as a trigger and cause the client device 302 to broadcast or advertise a signal for the facility device 306 to receive in accordance with one or more implementations described herein.

As mentioned above, and as shown in FIG. 3, the facility device 306 may include or implement an antenna device 314 for receiving and transmitting one or more signals. In one or more embodiments, the transmission power of the antenna device 314 is tuned to facilitate detecting the presence of the client device 302 within a predetermined proximity. For example, the secure verification system 118 may tune a transmission power of one or more antennas of the antenna device 314 to enable the facility device 306 to detect a position of the client device 302 within a predetermined distance from the facility device 306. The secure verification system 118 may tune the transmission power such that the facility device 306 detects the client device 302 at a far enough distance to enable the secure verification system 118 to receive a signal and update a subset of entries prior to the user 304 arriving at the door. In addition, the secure verification system 118 may tune the transmission power such that the facility device 306 detects the client device 302 at a near enough distance to prevent the client device 302 from actively broadcasting a signal too soon and potentially overutilizing a battery of the client device 302.

In addition to tuning the antenna device 314 to a desired transmission power, the secure verification system 118 may additionally utilize the antenna device 314 to determine an angle of arrival of a signal transmitted by the client device 302. By way of example, based on an internal clock and a timing of the signal received at multiple antennas on the antenna device 314, the secure verification system 118 can calculate or otherwise determine an angle of arrival of the signal transmitted from the client device 302. The secure verification system 118 may additionally determine a distance from the facility device 306 as well as a direction that the client device 302 is traveling relative to the facility device 306 based on the calculated angle of arrival. In one or more implementations, this procedure of determining an angle of arrival may be performed in connection with existing technology, such as Bluetooth angle of arrival (AoA), WiFi 802.11mc, or other existing technologies.

In accordance with one or more embodiments described above, the secure verification system 118 can determine whether a trigger condition applies based on characteristics of the signal broadcast by the client device 302. For example, based on the transmission power of the antenna device 314, the secure verification system 118 can accurately determine whether the client device 302 is within a predetermined distance of the facility device 306. In addition, based on the calculated angle of arrival, the secure verification system 118 can determine both a direction relative to the facility device 306 as well as a direction of movement of the client device 302 to determine that the user 304 and client device 302 are approaching the facility 308.

As discussed above, upon receiving the signal from the client device 302, the secure verification system 118 can identify an entry from a collection of entries to identify a portion of user verification information that likely corresponds to the user 304 of the client device 302. In particular, the secure verification system 118 can apply an algorithm and/or decryption key received when registering the client device 302 and facility device 306 to an encrypted value received via the signal to identity an entry and update a subset of entries to include the user verification information corresponding to the client device 302. In one or more embodiments, the secure verification system 118 adds the identified entry to a local cache or temporary database accessible to the facility device 306 or scanning system that may be used in verifying an identity of the user 304.

In particular, as the user 304 approaches the door of the facility 308, a face scanner 310 may perform a scan of a face of the user 304. The secure verification system 118 on the facility device 306 (or a verification system operating directly in connection with the face scanner 310) may compare the scan with the subset of entries to determine whether the scanned face data matches user verification data from the entry within the subset of entries. If the face data and user verification data match, the door may open and provide the user 304 access to the facility 308. Alternatively, if the face scan and verification data do not match, the door may remain locked, and the user 304 may be asked to provide additional verification data (e.g., a voice scan, a fingerprint scan, a password, a key card) or be refused admission to the facility 308.

While FIG. 3 illustrates an example including a single facility device 306 positioned on a door of a facility 308, the secure verification system 118 may be implemented across a plurality of facility devices associated with a single facility or organization (which may include multiple buildings or facilities). For example, FIG. 4 illustrates an example environment 400 including a facility 402 having two facility devices 404a-b positioned at doors of the facility 402. Each of the facility devices 404a-b may include secure verification systems implemented thereon. In addition, each of the doors of the facility 402 may include face scanning devices 406a-b for verifying an identity of individuals via face scans.

Figure 4:
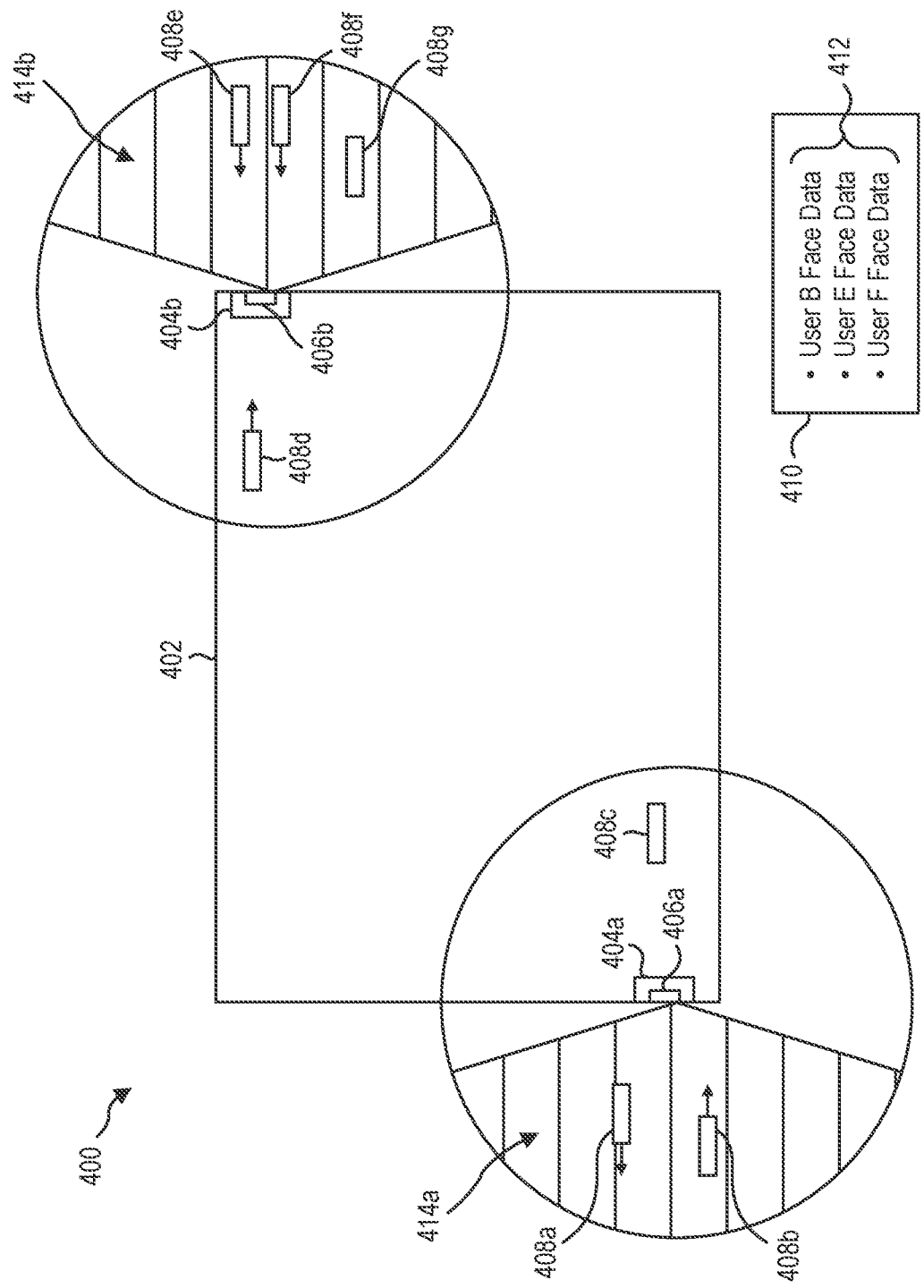
FIG. 4 illustrates an example implementation of an organization including multiple facility devices that cooperatively facilitate verifying one or more individuals in accordance with one or more implementations.

As further shown in FIG. 4, the environment 400 includes a number of client devices 408a-g positioned around and inside the facility 402. For ease in explanation, each of the client devices 408a-g refer to client devices that have been registered with the cloud computing system 101 and for which the facility devices 404a-b have registration information that enables either of the facility devices 404a-b to decipher signals transmitted by the individual client devices 408a-g. Accordingly, each of the client devices 408a-g may generate and transmit a signal including a value that the facility devices 404a-b receive and decipher using registration information previously received from the cloud computing system 101.

Additional detail will now be given with respect to determining a trigger condition and determining whether to add entries corresponding to various client devices to a local cache 410 that provides access to a subset of entries 412 from a larger collection of entries. For example, based on characteristics of a received signal broadcast by a first client device 408a, a secure verification system on the first facility device 404a may determine that the first client device 408a, while within a predetermined proximity and positioned in a direction relative to the facility device 404a (e.g., within a first region 414a) indicative of a trigger condition, is moving in a direction away from the facility device 404a. Accordingly, the secure verification system 118 may determine that a trigger condition does not apply to the first client device 408a.

The first facility device 404a may additionally receive and decipher a signal broadcast by a second client device 408b. Based on characteristics of the signal (e.g., an angle of direction), the first facility device 404a may determine that the second client device 408b is within a predetermined proximity, positioned on the outside of the building, and moving toward the facility device 404a. As an alternative to generally determining that the second client device 408b is outside, the facility device 404a may determine that the second client device 408b is within a region 414a determined to correspond to a positive identification of a trigger condition. Accordingly, based on a proximity, position, and movement of the second client device 408b, the secure verification system on the first facility device 404a may determine that a trigger condition applies for the second client device 408b.

It will be understood that while FIG. 4 illustrates example regions 414a-b in accordance with one embodiment, the shape and configuration of the regions 414a-b relative to the respective facility devices 404a-b is provided by way of example and not limitation. The size and orientation of the regions 414a-b may depend on a tuned transmission power, specifications and/or settings applied to an antenna device on the facility devices 404a-b, and other configuration of the secure verification system 118 that affects a geographic region over which the secure verification system 118 can detect a proximity and orientation of a client device relative to the facility devices 404a-b.

In response to determining that the trigger condition applies for the second client device 408b, the first facility device 404a may update a subset of entries 412 on a local cache 410 accessible to each of the facility devices 404a-b to include an entry corresponding to the second client device 408b. In particular, as shown in FIG. 4, first facility device 404a may update the subset of entries 412 to include user verification data corresponding to a predicted user of the second client device 408b.

The first facility device 404a may also receive and decipher a signal broadcast by a third client device 408c. Based on characteristics of the signal, the first facility device 404a may determine that while the third client device 408c is within a predetermined proximity to the facility device 404a, an angle of arrival (or other characteristic of the signal) indicates that the third client device 408c is already inside the facility 402 and that a trigger condition does not apply to the third client device 408c. Accordingly, the first facility device 404a may take no action with respect to an entry associated with a user of the third client device 408c.

Similar to the third client device 408c, the fourth client device 408d is positioned within the facility 402, but within a proximity of a second facility device 404b. The second facility device 404b may detect that the fourth client device 408*d* is within a proximity of the second facility device 404*b* and even moving toward the facility device 404*d*, but determine that a trigger condition does not apply based on a direction of the fourth client device 408*d* relative to the position of the second facility device 404*b*. Accordingly, the second facility device 404*b* may take no action with respect to an entry associated with a user of the fourth client device 408*d*.

As shown in FIG. 4, both a fifth client device 408*e* and a sixth client device 408*f* are positioned outside the facility 402 (e.g., within a second region 414*b* corresponding to a positive trigger condition for the second facility device 404*b*) and moving toward the second facility device 404*b*. The second facility device 404*b* may independently receive and decipher signals broadcast by each of the fifth client device 408*e* and sixth client device 408*f* to determine that a trigger condition applied to each of the fifth and sixth client devices 408*e-f*. Based on this determination, the second facility device 404*b* can update the subset of entries 412 to include a second entry corresponding to user verification data for a predicted user of the fifth client device 408*e* and a third entry corresponding to user verification data for a predicted user of the sixth client device 408*f*.

The environment 400 further includes a seventh client device 408*g* positioned within a proximity of the second facility device 404*b* and in a direction relative to the second facility device 404*b* indicative of a trigger condition (e.g., positioned within the second region 414*b*). Based on characteristics of a signal (e.g., a calculated angle of arrival) received from the seventh client device 408*g*, however, the second facility device 404*b* may determine that the seventh client device 408*g* is not moving and determine that a trigger condition does not apply. Accordingly, the second facility device 404*b* may take no action with respect to an entry associated with a user of the seventh client device 408*g*.

Because the subset of entries 412 represents a dynamic list of client devices that currently satisfy a set of trigger conditions, the subset of entries 412 may be frequently updated based on additional movement or a change in position of one or more of the client devices 408*a-f*. For example, when the second client device 408*b* enters the facility 402 via a door associated with the first facility device 404*a*, the first facility device 404*a* may wait a period of time (e.g., 30 seconds, 1 minute) after the trigger condition no longer applies to the second client device 408*b* and remove the entry from the subset of entries 412. Alternatively, the first facility device 404*a* may immediately remove the entry from the subset of entries based on the trigger condition no longer applying. As a further example, the first facility device 404*a* may remove the entry from the subset of entries based on a successful verification of the user of the client device 408*b*.

As shown in FIG. 4, each of the doors of the facility 402 may additionally include face scanners 406*a-b* for scanning faces of individuals as they approach the door. For example, a first face scanner 406*a* may capture or scan a face of a user of the second device 408*b* and compare the scanned face to the local subset of entries 412 to identify that the face of the user corresponds to user verification data of the first entry. Based on the positive comparison, the door may open automatically or otherwise provide access to the user of the second client device 408*b*.

Similar to verifying an identity of the user of the second client device 408*b*, the second facility device 404*b* may additionally verify the identities of the users of the fifth and sixth client devices 408*e-f*. In particular, the second face scanner 406*b* may perform face scans of the users as they approach the face scanner 406*b* and the second facility device 404*b* (or face scanner 406*b*) may compare the scanned faces with the subset of entries 412 to verify that the users of the client devices 408*e-f* match a corresponding entry from the subset of entries 412.

In the case that a face scan does not match an entry from the subset of entries 412, one or more devices of the facility 402 may perform additional verification procedures. For example, rather than limiting analysis to the subset of entries 412, the facility devices may broaden the search to a full collection of entries for an entire organization. Where one or more devices of the facility 402 are unable to verify an identity of a user, one of the facility devices may determine that the client device was stolen or otherwise misappropriated and provide an alert to the known individual associated with the client device.

In one or more embodiments, one or more of the client devices may toggle between an active mode and a passive mode associated with a frequency that the respective client device(s) is scheduled to broadcast a signal. For example, prior to entering a proximity of a facility device, a client device may operate in a passive mode where the client device advertises a signal in accordance with settings of the passive mode. Once the client device comes within a proximity of the facility device, the client device may activate an active mode in which the client device broadcasts signals with greater frequency.

In addition, once the user has been verified or when a trigger condition no longer applies, the client device may again operate in a passive mode where the client device advertises the signal less frequently. In this way, the facility devices may avoid causing the batteries of registered client devices to drain while the client devices are within a trusted facility.

Figure 5:
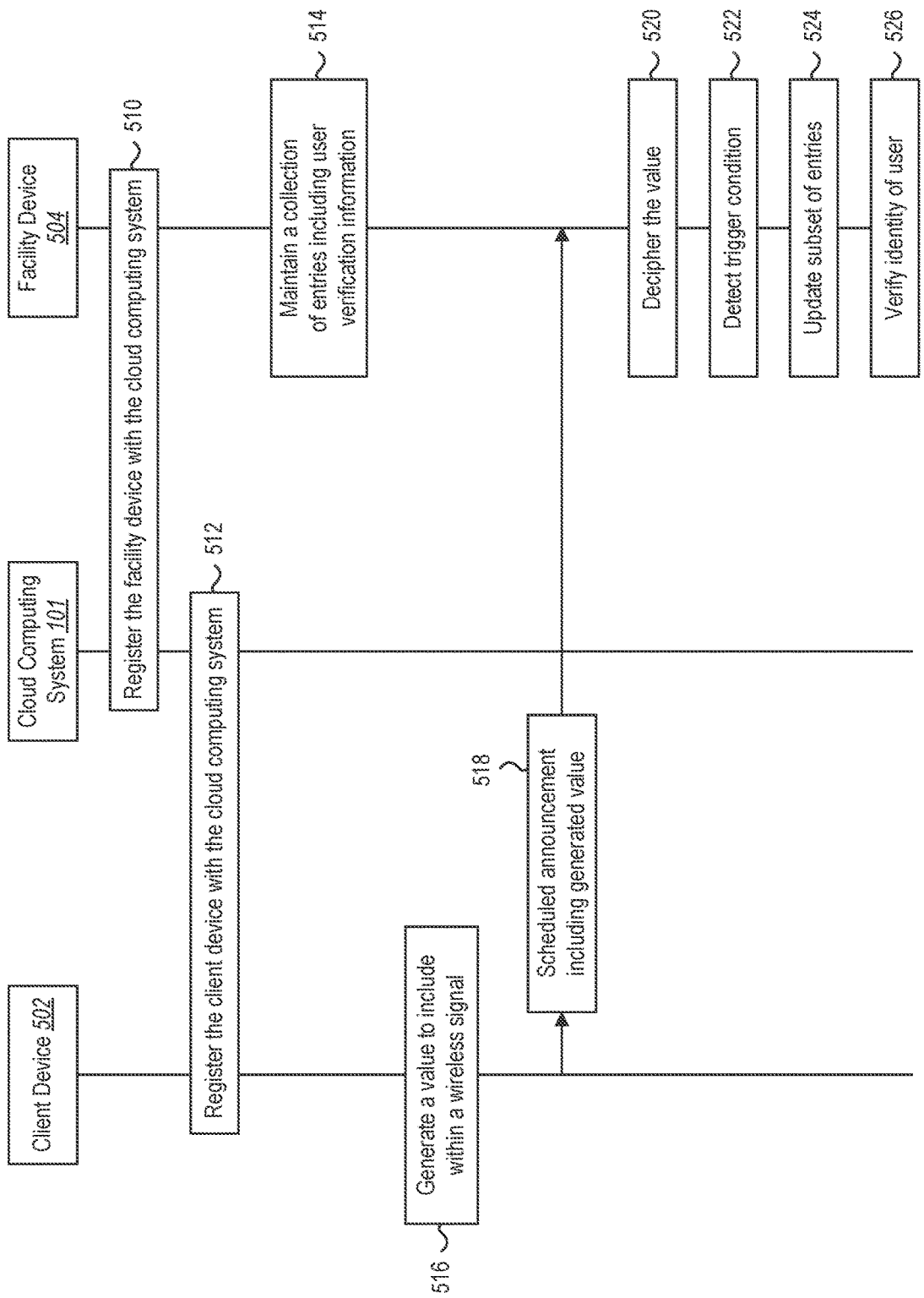
FIG. 5 illustrates an example implementation of registering a client device and performing secure verification of an individual associated with the client device.
Figure 6:
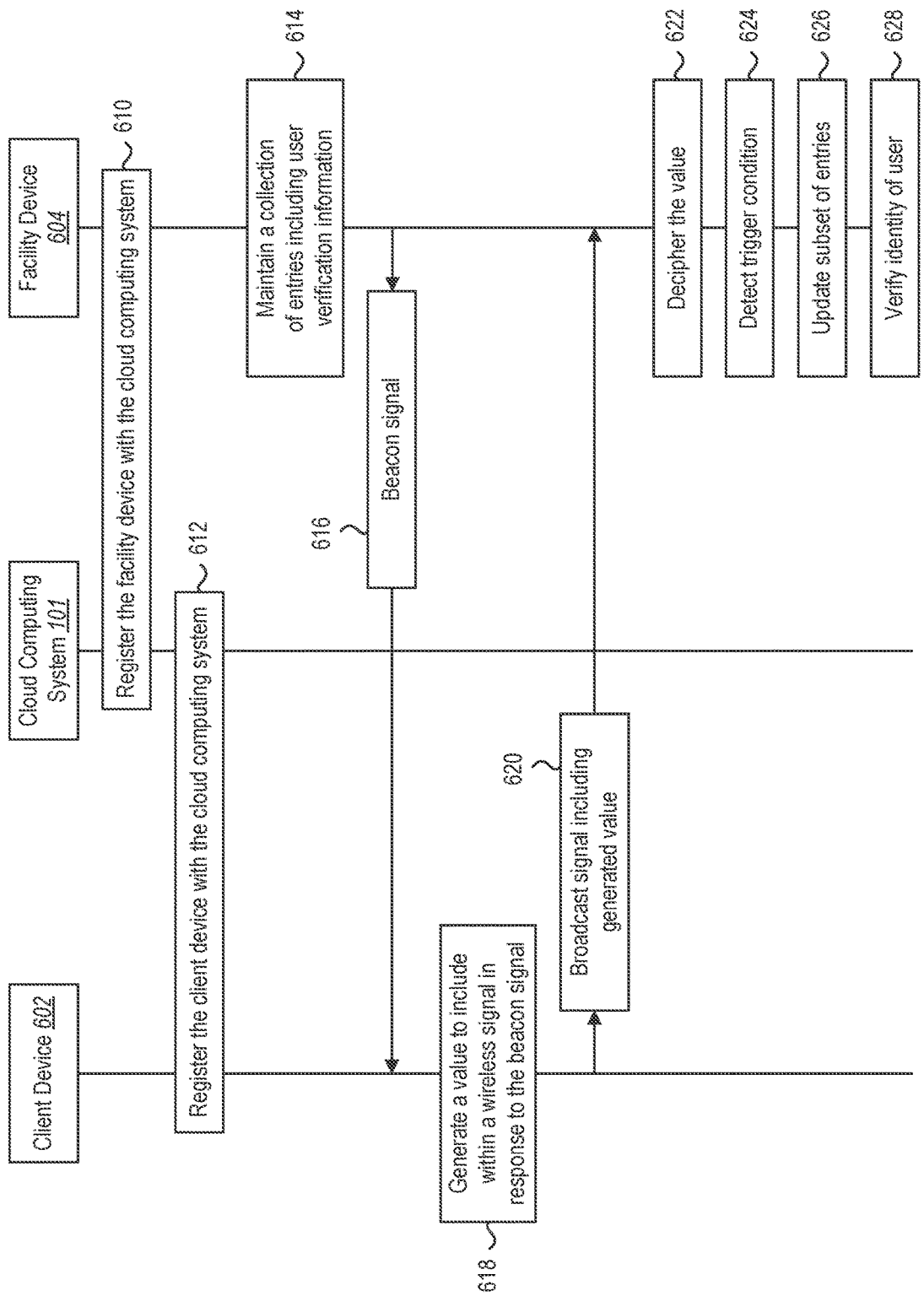
FIG. 6 illustrates another example implementation of registering a client device and performing secure verification of an individual associated with the client device.

FIGS. 5-6 illustrate additional embodiments in which a secure verification system 118 may be implemented. For example, FIG. 5 illustrates an example in which a client device generates and advertises a signal based on an advertisement schedule in accordance with one or more settings of an operating system on the client device. Alternatively, FIG. 6 illustrates an example in which a client device generates and advertises a signal in response to receiving a beacon signal generated and provided by a facility device.

For example, FIG. 5 illustrates an example in which a cloud computing system 101 and a facility device 504 perform an act 510 of registering the facility device 504 with the cloud computing system 101. The cloud computing system 101 and client device 502 may additionally perform an act 512 of registering the client device 502 and associated user with the cloud computing system 101. As discussed above, the acts 510, 512 of registering the facility device 504 and the client device 502 may involve the cloud computing system 101 acting as a broker between the client device 502 and the facility device 504 by distributing registration information between the different devices.

By way of example, the cloud computing system 101 may distribute a master key (e.g., a master advanced encryption standard (AES) key) that may be used to derive a key schedule such that the client device 502 and facility device 504 can use corresponding encryption and decryption keys based on a schedule. Each registered device may receive a different key. In addition, the keys may be random rather than sequential to avoid potential tracking of the client device 502 by third parties without an ability to decrypt a payload, which is made possible by the corresponding key provided to the facility device 504.

As shown in FIG. 5, the facility device 504 may perform an act 514 of maintaining a collection of entries including user verification information. The collection of entries may include user verification information associated with any number of users and corresponding client devices. For example, the collection of entries may include biometric data and other personal information that may serve as a verification source to use in comparing data obtained via a face scan, fingerprint scan, or other biometric scan.

The client device 502 may perform an act 516 of generating a value to include within a wireless signal to be transmitted from the client device 502. In one or more examples, the value is a rotating temporary identifier for the client device 502. As another example, the value may be a random value assigned by the cloud and associable to the client device 502. As a further example, the value may include a value generated or assigned in accordance with a key schedule received when registering the client device 502. In one or more embodiments, the value refers to an encrypted or encoded value that the facility device 504 is capable of deciphering using a key, schedule, and/or any registration information received when registering the facility device 504 and client device 502.

As shown in FIG. 5, the client device 502 may perform an act 518 of broadcasting an announcement (e.g., a scheduled announcement) that includes the value generated by the client device 502 (or assigned to the client device 502). In one or more embodiments, the client device 502 broadcasts the announcement in accordance with a schedule as determined by an application, operating system, or hardware of the client device 502. For example, in one or more embodiments, the client device 502 announces the value via a wireless signal such that any device within a proximity may receive the value. Nevertheless, because the value is random, encrypted, or otherwise non-decipherable by another device not in possession of corresponding registration information provided by the cloud computing system 101, the association of the value with the client device 502 is nonetheless secure and does not provide personal or device information to other devices that have not been registered via the cloud computing system 101.

Upon receiving the signal and associated value, the facility device 504 may perform an act 520 of deciphering the value. Deciphering the value may include applying an algorithm (e.g., a decryption algorithm) to the value from the signal to determine an identifier of the client device 502 associated with a corresponding entry from a collection of entries. Accordingly, the facility device 504 may use the deciphered value to identify user verification information that corresponds to an identifier of the client device 502.

As discussed in one or more examples above, the acts of generating the value, broadcasting the value, and deciphering the value to determine an identity of the client device 502 and/or user associated with the client device 502 may be performed by way of a wireless communication medium between the client device 502 and the facility device 504. For instance, rather than the client device 502 querying the cloud to determine a key schedule or obtain a current encryption key, the client device 502 may rely on the registration information to locally generate and broadcast a value to the facility device 504. In turn, rather than querying the cloud computing system 101 to obtain a decryption key or current key schedule, the facility device 504 may similarly rely on the registration information to determine an algorithm to apply to the value to determine an identifier of the client device 502.

While this offline verification may be performed after a single registration of the client device 502 and facility device 504, the cloud computing system 101 may nonetheless provide periodic updates to boost security of the verification processes described herein. For example, in one or more embodiments, the cloud computing system 101 may provide an updated key schedule and master key to the client device 502 and facility device 504 that serve as a current key schedule and master key for a temporary period of time (e.g., one day). Thus, while not necessarily in response to detecting an exchange of data between the client device 502 and facility device 504, the cloud computing system 101 may periodically provide updated or current registration information to the respective devices to boost security in case a key or key schedule is improperly distributed or obtained by an unregistered client device and/or facility device.

The facility device 504 may additionally perform an act 522 of detecting a trigger condition. As discussed above, detecting a trigger condition may include analyzing characteristics of the signal advertised from the client device 502 to determine a proximity of the client device 502 relative to the facility device 504, a direction of the client device 502 relative to the facility device 504, and a direction of movement of the client device 502 (e.g., based on an angle of arrival determined for the advertised signal).

In response to detecting the trigger condition, the facility device 504 may perform an act 524 of updating a subset of entries to include an entry corresponding to the client device 502. In one or more embodiments, the facility device 504 updates a local cache stored on or otherwise accessible to the facility device 504. In one or more embodiments, the facility device 504 updates a subset of entries to include mapping information that points to an entry from a collection of entries stored on or otherwise accessible to the facility device 504.

In addition, at a time subsequent to updating the subset of entries, the facility device 504 may perform an act 526 of verifying the identity of a user of the client device 502 by comparing a biometric scan of the user with the subset of entries maintained by the facility device 504. For example, the facility device 504 can compare a face scan to face verification data included within the subset of entries. Based on verifying an identity of the individual, the facility device 504 may grant access to a facility, computer, or other system in accordance with permissions associated with the verified individual. For example, the facility device 504 may cause a door to open to grant physical access to a facility. As another example, the facility device 504 may automatically log in to a computing device and provide access to applications on the device or a central computing system based on a successful verification of the individual.

FIG. 6 illustrates another example in which a cloud computing system 101, client device 602 and facility device 604 cooperatively perform acts to verify the identity of an individual based on a signal transmitted by a client device associated with the individual. Similar to FIG. 5, the cloud computing system 101 and the facility device 604 may perform an act 610 of registering the facility device 604 with the cloud computing system. Also similar to FIG. 5, the cloud computing system 101 and the client device 602 may perform an act 612 of registering the client device 602 with the cloud computing system. Moreover, similar to act 514 discussed above, the facility device 604 may perform an act 614 of maintaining a collection of entries including user verification information associated with users of registered client devices.

As shown in FIG. 6, the facility device 604 may perform an act 616 of broadcasting or otherwise transmitting a beacon signal to be detected by a client device 602. For example, where an operating system or hardware of the client device 602 does not permit periodically broadcasting a discovery signal or other signal in accordance with one or more embodiments described herein, the beacon signal may act as a trigger for the client device 602 to open a program or cause a particular program to operate in a foreground of an operating system to enable the client device 602 to perform an act 618 of generating a value to include within a wireless signal to be transmitted from the client device 602 (e.g., similar to the act 516 discussed above in connection with FIG. 5).

In one or more embodiments, the facility device 604 transmits the beacon signal based on a generic attribute (GATT) profile service running on the client device 602. For example, the facility device 604 may detect the GATT service when the client device 602 moves within a proximity of the facility device 604 and provide the beacon signal to trigger the client device 602. In accordance with one or more embodiments described herein, the client device 602 may then generate and transmit the signal in response to receiving the beacon signal.

The client device 602 and facility device 604 may additionally perform an act 620 of broadcasting a signal including the generated value. In response to receiving the signal, the facility device 604 may perform an act 622 of deciphering the signal, an act 624 of detecting a trigger condition, an act 626 of updating a subset of entries, and an act 628 of verifying an identity of a user of the client device 602. It will be understood that the acts 620-628 illustrated in FIG. 6 may be similar to corresponding acts 518-526 discussed above in connection with FIG. 5.

While FIG. 6 illustrates an example implementation in which the client device 602 and facility device 604 perform an offline verification for an individual, it will be understood that the client device 602, cloud computing system 101, and facility device 604 may perform one or more additional acts in verifying that the user of the client device 602 (or the client device itself) matches user verification information. For example, rather than generating and providing a value within a wireless signal to the facility device 604, the client device 602 may publish a service. The facility device 604 may then connect to the service and request a generated value, which is then supplied to the client device 602 (e.g., by the cloud computing system 101 or the facility device 604 itself). The client device 602 may provide the generated value to the facility device 604. The facility device 604 may then utilize the value to perform acts 622-628 as described above.

While the implementations illustrated in FIG. 5 and FIG. 6 may refer to alternative implementations, in one or more embodiments, an environment may include client devices and facility devices that respectively perform acts corresponding to both FIGS. 5 and 6. For example, a facility device may interact with a first client device in accordance with the implementation described in FIG. 5 based on a make or model of the first client device and/or settings of an application operating thereon. Conversely, the facility device may interact with a second client device in accordance with the implementation described in FIG. 6 based on a different make or model of the second client device and/or different settings of an application operating thereon.

In addition, as discussed above, a single client device may be registered in connection with multiple organizations. Accordingly, to avoid sharing confidential or private information between the two different organizations, the cloud computing system 101 may independently register the client device with the corresponding organizations by providing different registration information to the respective facilities. This may include distributing different keys and key schedules to the different organizations. This may also include verifying the user against different biometric information maintained by the respective organizations. For example, the user may verify an identity based on a face scan at a first organization and a fingerprint scan at a second organization. In addition, even where verifying an identity based on the same type of biometric scan, each of the organizations may manage and use distinct collections of entries and subsets of entries when verifying an identity of the user of the client device.

Figure 7:
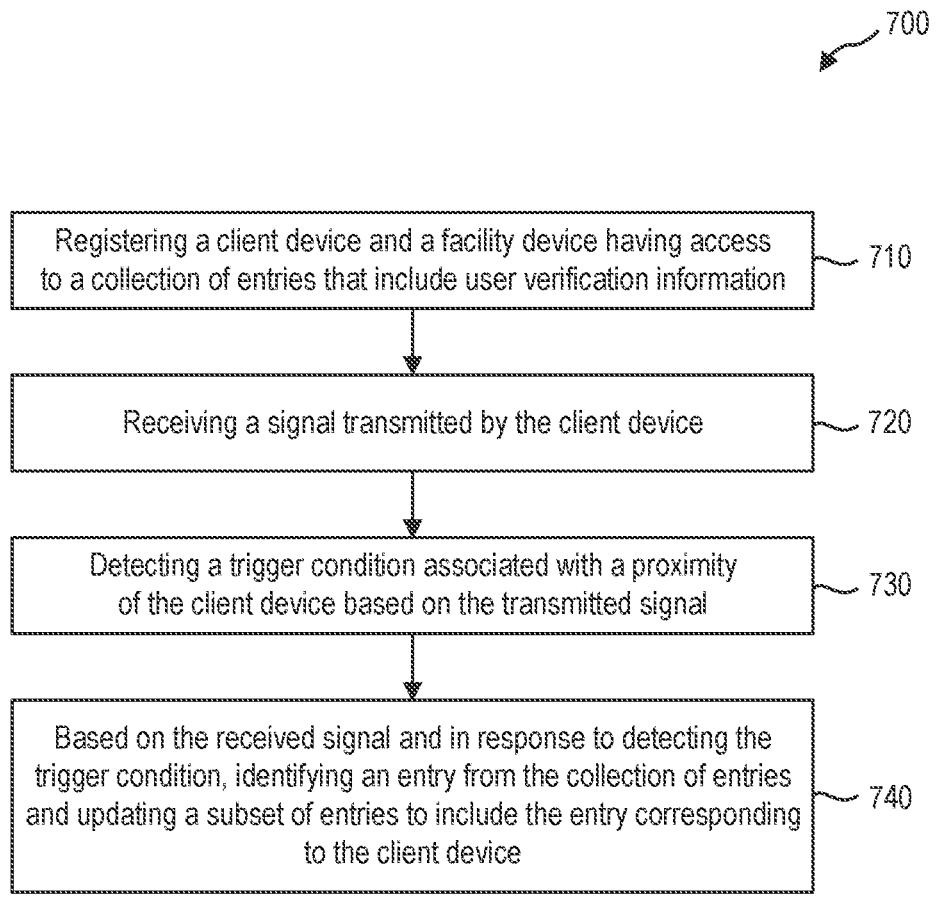
FIG. 7 illustrates an example method of performing secure verification of an individual based on a signal transmitted by a client device in accordance with one or more implementations.

Turning now to FIG. 7, this figure illustrates an example flowchart including a series of acts for performing an offline verification of a user of a client device based on a signal transmitted by the client device and received at a facility device. While FIG. 7 illustrates acts according to one or more embodiments, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a server device to perform the acts of FIG. 7. In still further embodiments, a system can perform the acts of FIG. 7.

As shown in FIG. 7, the series of acts 700 includes an act 710 of registering a client device and a facility device having access to a collection of entries that include user verification information. For example, the act 710 may include receiving registration information for a client device at a facility device where the facility device has access to a collection of entries including user verification information associated with a plurality of client devices. In one or more implementations, receiving the registration information for the client device comprises receiving decryption information that enables the facility device to decrypt the value from the signal to identify the entry from the subset of entries where the entry includes user verification information corresponding to a user of the client device. In one or more implementations, the registration information is received from a cloud computing system based on a registration of the client device and the facility device.

In one or more embodiments, the series of acts 700 includes registering the client device with an organization. The organization may include a plurality of facility devices including the facility device. Each of the facility devices from the plurality of facility devices may have access to the subset of entries. In addition, in one or more implementations, the user verification information includes biometric data that may be compared to scanned biometric data obtained using a biometric scanning device to verify that a user of the client device corresponds to an identity of an individual associated with the user verification information from the entry.

The series of acts 700 may additionally include an act 720 of receiving a signal transmitted by the client device. For example, the act 720 may include receiving a signal transmitted by the client device where the signal includes a value associated with the client device. In one or more implementations, receiving the signal transmitted by the client device comprises receiving a scheduled advertisement of an encrypted value associated with the client device.

The series of acts 700 may also include an act 730 of detecting a trigger condition associated with a proximity of the client device based on the transmitted signal. For example, the act 730 may include detecting a trigger condition associated with a proximity of the client device relative to the facility device based on the signal transmitted by the client device.

Detecting the trigger condition may include detecting that the client device is both within a predetermined proximity and in a predetermined direction relative to the facility device. The series of acts 700 may include tuning a transmission power of an antenna on the facility device where the predetermined proximity is based on the tuned transmission power of the antenna. Moreover, detecting the trigger condition may include detecting that the client device is moving towards the facility device based on a determined angle of arrival of the signal transmitted by the client device and received at the facility device.

As further shown in FIG. 7, based on the received signal and in response to detecting the trigger condition, the series of acts 700 may include an act 740 of identifying an entry from the collection of entries and updating a subset of entries to include the entry corresponding to the client device. For example, the act 740 may include, in response to detecting the trigger condition: identifying an entry from the collection of entries corresponding to the client device; and updating a subset of entries to include the entry from the collection of entries corresponding to the client device and including user verification information for an individual associated with the client device.

In one or more implementations, the series of acts 700 further includes applying a decryption algorithm from the received registration information to the encrypted value to generate a decrypted value and identifying the entry from the collection of entries corresponding to the client device is based on the decrypted value. In one or more implementations, the series of acts 700 includes broadcasting a beacon signal that alerts the client device to the proximity of the client device relative to the facility device and triggers transmission of the signal by the client device. In one or more embodiments, receiving the signal transmitted by the client device includes receiving an advertisement of an encrypted value associated with the client device generated in response to the beacon signal. Moreover, the series of acts 700 may include applying a decryption algorithm from the received registration information to the encrypted value to generate a decrypted value and identifying the entry from the collection of entries corresponding to the client device is based on the decrypted value.

In one or more embodiments, the series of acts 700 may include detecting that the trigger condition no longer applies. In response to detecting that the trigger condition no longer applies, the series of acts 700 may include updating the subset of entries by removing the entry corresponding to the client device from the subset of entries.

In one or more implementations, the series of acts 700 includes verifying an identity of a user of the client device based on comparing biometric data obtained via a biometric scan of the user with user verification information from the subset of entries. Based on a detected match between the biometric data and user verification information from the entry included within the subset of entries, the series of acts 700 may include performing a prescribed action based on one or more permissions associated with the individual (e.g., facility access, access to a computer or system of computers).

Figure 8:
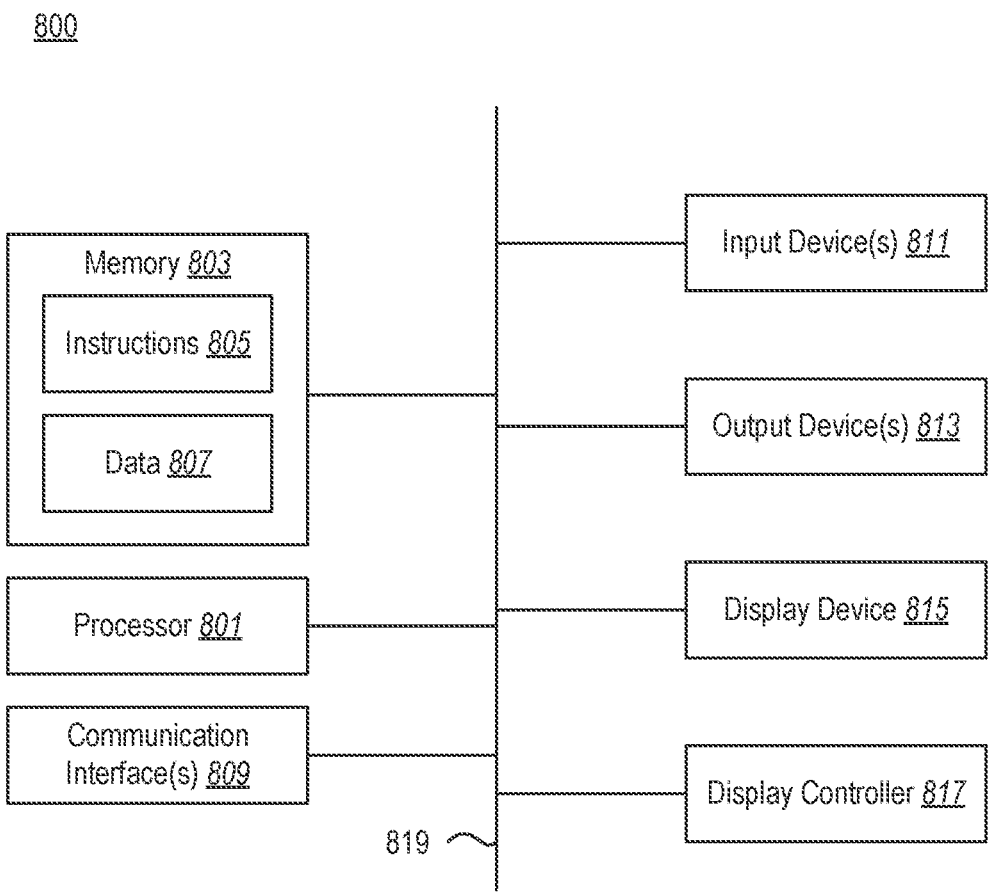
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    receiving, at a facility device, registration information including a device identifier associated with a mobile device and decryption information, wherein the facility device has access to a collection of entries including a plurality of device identifiers associated with a plurality of mobile devices;
    transmitting, by the facility device, a beacon signal to the mobile device that alerts the mobile device to a proximity between the facility device and the mobile device;
    receiving, at the facility device in response to the beacon signal, one or more signals transmitted by the mobile device, the one or more signals including a value associated with the device identifier;
    identifying an entry from the collection of entries by decrypting the value from the one or more signals using the decryption information; and
    determining, based on the one or more received signals transmitted by the mobile device, a trigger condition associated with the proximity between the facility device and the mobile device.

2. The method of claim 1, wherein determining the trigger condition includes determining that the mobile device is within a threshold distance from the facility device.

3. The method of claim 1, wherein the trigger condition is based on a directional position of the mobile device relative to a position of the facility device.

4. The method of claim 1, wherein the trigger condition is based on movement of the mobile device relative to a position of the facility device.

5. The method of claim 1, wherein determining the trigger condition includes determining that the mobile device is both within a threshold distance from the facility device and that a distance between the facility device and mobile device is decreasing.

6. The method of claim 4, further comprising determining that a distance between the facility device and the mobile device is decreasing based on a determined angle of arrival of the one or more signals transmitted by the mobile device.

7. The method of claim 1, wherein the one or more signals includes multiple signals transmitted by the mobile device in response to the beacon signal, and wherein determining the trigger condition includes detecting a change in position between the facility device and the mobile device based on differences in signal characteristics between subsequent transmissions of the multiple signals.

8. The method of claim 7, wherein the signal characteristics include one or more of:
    signal strengths of the multiple signals transmitted by the mobile device; or
    angles of arrival of the multiple signals transmitted by the mobile device.

9. The method of claim 1, wherein transmitting the beacon signal includes broadcasting the beacon signal to any of a number of mobile devices within receiving distance of the facility device.

10. The method of claim 9, wherein transmitting the beacon signal includes broadcasting instances of the beacon signal at fixed intervals.

11. The method of claim 1, wherein the registration information is received from a cloud computing system based on registration of the facility device and the mobile device.

12. The method of claim 1, further comprising causing, based on the trigger condition, the mobile device to engage an active state in which the mobile device transmits additional signals at more frequent time intervals than one or more signals transmitted prior to engaging the active state.

13. The method of claim 1, further comprising, based on the trigger condition, identifying the entry from the collection of entries corresponding to the mobile device.

14. The method of claim 13, wherein the registration information includes user verification information, the user verification information including biometric data that may be compared to scanned biometric data obtained using a biometric scanning device to verify that a user of the mobile device corresponds to an identity of an individual associated with a corresponding value from the entry.

15. A system, comprising:
one or more processors;
memory in electronic communication with the one or more processors; and
instructions stored in the memory, the instructions being executable by the one or more processors to cause a facility device to:
receive registration information including a device identifier associated with a mobile device and decryption information, wherein the facility device has access to a collection of entries including a plurality of device identifiers associated with a plurality of mobile devices;
transmit a beacon signal to the mobile device that alerts the mobile device to a proximity between the facility device and the mobile device;
receive, in response to the beacon signal, one or more signals transmitted by the mobile device, the one or more signals including a value associated with the device identifier;
identify an entry from the collection of entries by decrypting the value from the one or more signals using the decryption information; and
determine, based on the one or more received signals transmitted by the mobile device, a trigger condition associated with the proximity between the facility device and the mobile device.

16. The system of claim 15, wherein the trigger condition is based on one or more of:
the mobile device being within a threshold distance from the facility device;
a directional position of the mobile device relative to a position of the facility device; or
movement of the mobile device relative to a position of the facility device.

17. The system of claim 15, wherein the one or more signals includes multiple signals transmitted by the mobile device in response to the beacon signal, and wherein determining the trigger condition includes detecting a change in position between the facility device and the mobile device based on differences in signal characteristics between subsequent transmissions of the multiple signals, the signal characteristics including one or more of:

signal strengths of the multiple signals transmitted by the mobile device; or
angles of arrival of the multiple signals transmitted by the mobile device.

18. The system of claim 15, further comprising causing, based on the trigger condition, the mobile device to engage an active state in which the mobile device transmits additional signals at more frequent time intervals than one or more signals transmitted prior to engaging the active state.

19. A non-transitory computer readable medium storing instructions thereon that, when executed by one or more processors, causes a facility device to:
receive registration information including a device identifier associated with a mobile device and decryption information, wherein the facility device has access to a collection of entries including a plurality of device identifiers associated with a plurality of mobile devices;
transmit a beacon signal to the mobile device that alerts the mobile device to a proximity between the facility device and the mobile device;
identify an entry from the collection of entries by decrypting the value from the one or more signals using the decryption information; and
receive, in response to the beacon signal, one or more signals transmitted by the mobile device, the one or more signals including a value associated with the device identifier;
determine, based on the one or more received signals transmitted by the mobile device, a trigger condition associated with the proximity between the facility device and the mobile device.

20. The non-transitory computer readable medium of claim 19, wherein the trigger condition is based on one or more of:
the mobile device being within a threshold distance from the facility device;
a directional position of the mobile device relative to a position of the device; or
movement of the mobile device relative to a position of the facility device.

* * * * *